Aug. 23, 1966    E. E. BROWN    3,268,266
PNEUMATIC CONVEYOR SYSTEM AND METHOD
Filed March 26, 1964    2 Sheets-Sheet 1
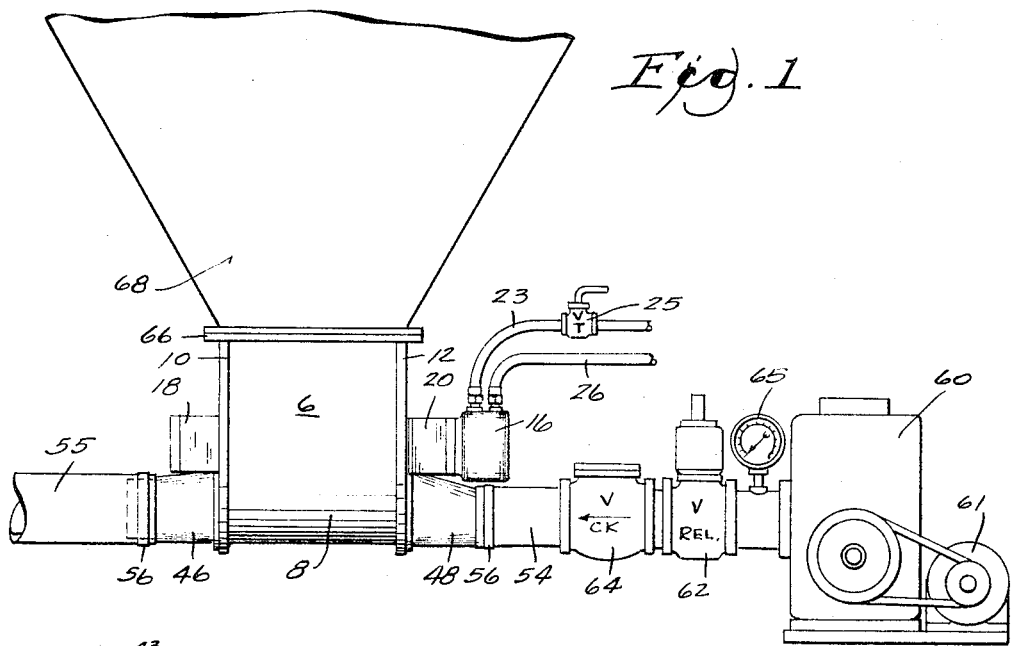
Fig. 1
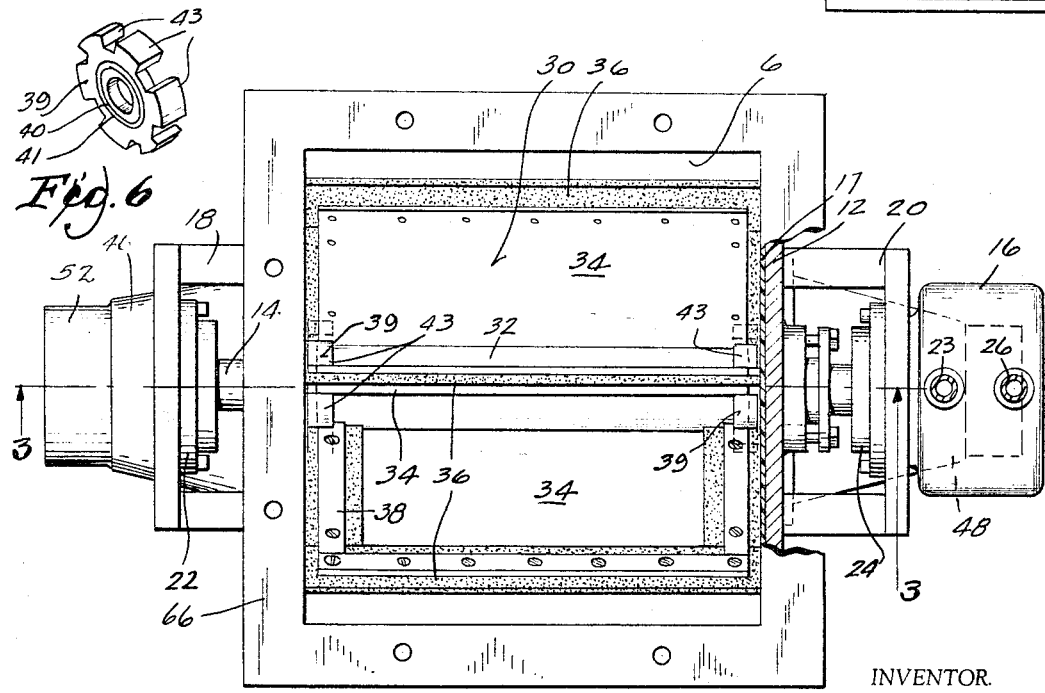
Fig. 6
Fig. 2
INVENTOR.
ELMER E. BROWN
BY
Wheeler, Wheeler + Wheeler
ATTORNEYS

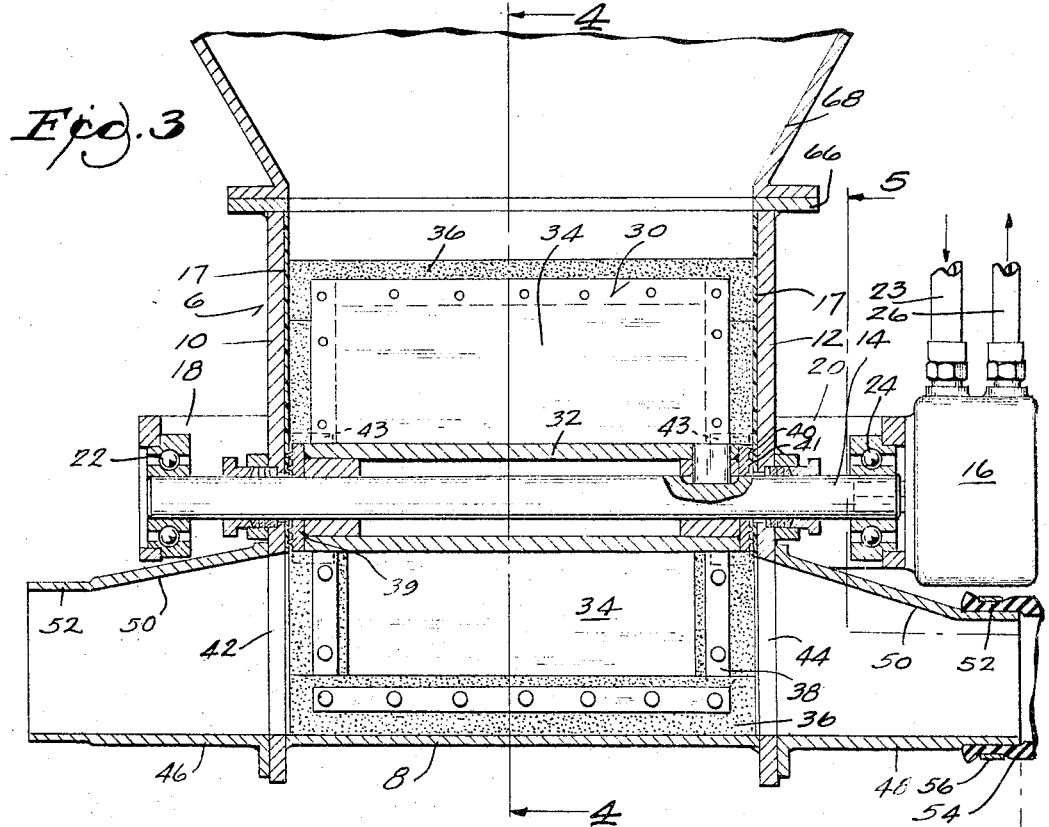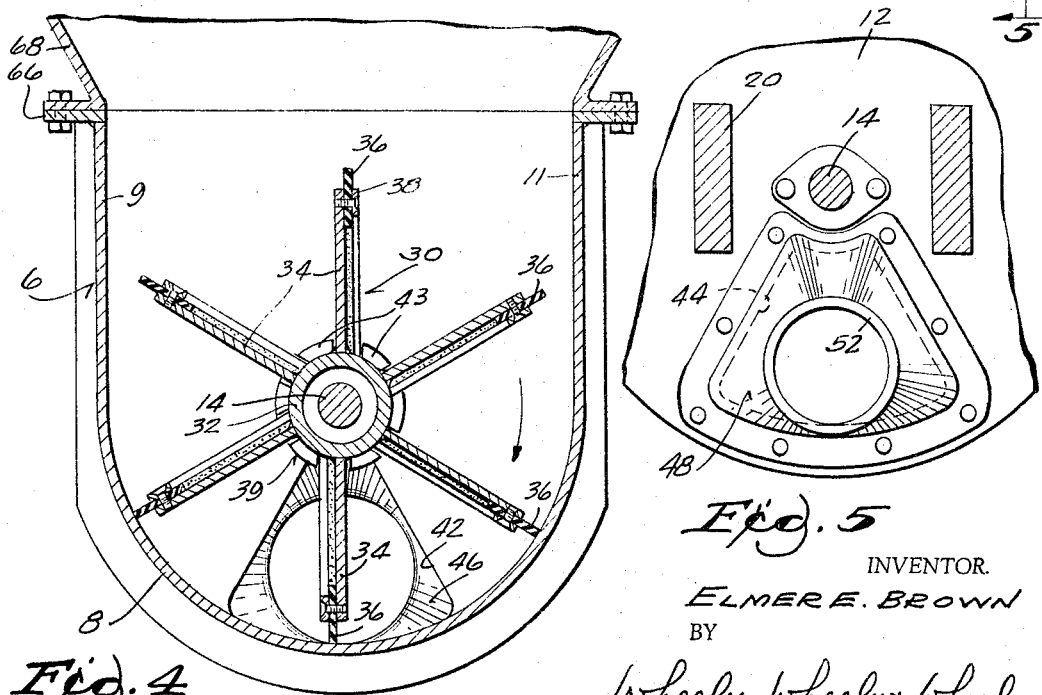

3,268,266
PNEUMATIC CONVEYOR SYSTEM AND METHOD
Elmer E. Brown, Milwaukee, Wis., assignor to Rex Chainbelt Inc., Milwaukee, Wis., a corporation of Wisconsin
Filed Mar. 26, 1964, Ser. No. 354,927
10 Claims. (Cl. 302—49)

This invention relates to a pneumatic conveyor system which is an improvement on a known arrangement for feeding a powder such as dry cement into a penumatic current for convection thereby through a pipe to a distant point.

The material to be conveyed is fed into a chamber which has a cylindrical bottom wall traversed by the blades or vanes of a rotary feeder. These vanes are preferably provided with wipers at their extremities and along their end margins where the blades are confined between the end walls of the chamber. In practice, it has been found desirable to line the end walls with synthetic rubber such as urethane. Also, it is preferred that the tubular hub of the rotor be provided with end caps which have fingers entering into the spaces between the vanes and which carry annular ribs that are radially spaced to provide a seal between the rotor and the lining of synthetic resin which faces the end walls of the chamber.

The end walls have inlet and outlet ports which are preferbly segmental and, in given positions of the rotor, register substantially precisely with the cross section of the interblade spaces. These ports are directly opposite each other in the chamber end walls. They may be provided with boots or adaptors leading from and to the inlet an outlet pipes through which convection air enters and the air and conveyed material are discharged to the point of delivery.

I have discovered that there is a significant relationship between the air supply pressure, the rate of rotation of the rotor and the length of the pipe through which delivery occurs. It has been found desirable that the air pressure be fixed as nearly as possible at 12 pounds per square inch. An important feature of the present invention is based on the discovery that the air pressure can be controlled to compensate for the numerous variables which might otherwise affect the proper functioning of the device, the control being affected simply by varying the rate of rotation of the rotor. Ordinarily, the length of delivery pipe, the number of bends therein, and the height of the delivery point varies from one installation to another. However, it is easily possible to compensate for these other variable factors by varying the speed of the motor which actuates the rotor.

In the drawings:
FIG. 1 is a view in side elevation fragmentarily illustrating a system embodying the invention.
FIG. 2 is a plan view on an enlarged scale looking into the top of the rotor chamber, portions of the chamber rim being broken away.
FIG. 3 is a view in section on the line 3—3 of FIG. 2.
FIG. 4 is a view in section on the line 4—4 of FIG. 3.
FIG. 5 is a view in section on the line 5—5 of FIG. 3.
FIG. 6 is a fragmentary detail view showing in perspective one of the end caps for the tubular rotor hub.

The chamber 6 has a generally cylindrical bottom wall 8 and parallel end walls 10 and 12 which are provided with bearing supports for a shaft 14 driven by motor 16. The end walls 10 and 12 are desirably provided with linings 17 of synthetic resin, urethane being the preferred material. These not only assist in providing a seal but are of particular importance in resisting abrasion. The side walls 9 and 11 above the cylindrical bottom are either parallel or, at least, preferably do not converge downwardly. The brackets 18 and 20 carry bearings at 22 and 24 in which the shaft 14 is mounted. The bracket 20 further supports the motor 16. The motor may be an electric motor but is desirably hydraulic for convenience and accuracy of speed control. It has an input fluid pressure line at 23 provided with a control valve 25. Fluid return is through the pipe 26.

It is important to the invention that means be provided for regulating carefully the speed of rotation of the rotor to the effect that compensation be made for back pressure related to maintain the air supply at a proper value such as approximately 12 pounds. If the length of the discharge pipe is short, for example, there will be little back pressure and the air delivered from the supply pump 60 will blast through the intervane spaces to deliver powder from the chamber at such a rate that the air pressure shown by gauge 65 will fall. Since it is the objective to deliver the powder at the fastest possible rate, the drop in air pressure means that the air is not being utilized to utmost capacity. Accordingly, the motor 16 which drives the rotor should be speeded up until the increased delivery of powder into the air stream reaches a value to which the increased resistance results in an increase in air pressure at the gauge 65. In practice, it is found that approximately 12 pounds at this point means that in the instant apparatus maximum capacity is maintained.

Mounted on the shaft 14 within the chamber 6 is a rotor 30 having a hub 32 from which project generally radial blades or vanes 34. The vanes preferably have wipers 36 at their outer margins and ends, such wipers being clamped to the blades by plates 38 and arranged to engage the inner surface of the cylindrical bottom wall 8 of the chamber and the liners 17 at the inner surfaces of the ends walls 10 and 12 of the chamber.

End caps 39 for the tubular hub 32 have annular beads at 40 and 41 which seat against the urethane linings 17 to provide seals between the rotor hub and end walls. Each of the end caps 39 is notched to receive the rotor blades and is preferably provided with fingers 43 which enter the spaces between blades to key the end cap seals to the rotor as clearly shown in FIGS. 2, 3 and 4.

The end walls 10 and 12 are provided with outlet and inlet ports 42 and 44 which desirably correspond precisely in outline and area with each intervane space. The arrangement is such that when the intervane space is in full registry with the respective ports 42 and 44, there is a continuous passage of substantially uniform cross section open through the ports 42 and 44 and across the chamber from one end of the chamber 6 to the other.

Boots or adaptors 46, 48 are bolted to the outside of the end walls 10 and 12 of the chamber and have smoothly tapered interior surfaces 50 which register at their larger ends with the ports 42 and 44 and lead smoothly to coupling tubes 52 which are usually of generally circular cross section and adapted to receive hoses or other pipes 54, 55 which may be held thereto by clamps as shown at 56 in FIG. 1 and FIG. 3.

Convection air is supplied by a blower 60 conventionally driven by any appropriate motor 61. The blower output is coupled through relief valve 62 and check valve 64 and one of the pipe or hose sections 54 to the boot or adaptor 48. The other boot or adaptor 46 leads the output of conveyed material into delivery pipe 55. A pressure gauge 65 is desirably located to measure the pressure of the air output of the blower 60.

The top of the chamber 6 is preferably flanged at 66 to facilitate connection therewith of any desired means for introducing into the chamber 6 the material to be pneumatically conveyed. For example, a hopper 68 may be used for this purpose and mounted as shown in FIGS. 1, 3 and 4. In the pneumatic convection of dry powdered maetrial, assuming the rotor speed to be in properly balanced relation to the air supply pressure and the length of the delivery pipe, the fact that the intervane spaces are in accurate registry successively with the inlet and outlet ports in the course of rotor rotation seems to eliminate susbtantially completely the tendency for stoppages to occur in previously known devices of this character.

While it is not essential that the air pressure be exactly 12 pounds, I have secured optimum results using air at that pressure. It is possible to set or use other air pressures (depending on the air supply used for the materials (cement, etc.) conveyed). For instance, it may be more efficient to operate at an air pressure of 20 pounds; again the rate of rotor speed can be controlled to the best advantage.

Starting with a fixed value, it becomes a very simple matter to adjust the rotor speed to give desired uniformity of delivery of the pulverant material. Regardless of the rate at which the material is introduced into the hopper 68 or the extent to which the chamber 6 is wholly or largely filled, the rotation of the vanes carride a full charge of material in successive intervane spaces between each consecutive pair of vanes and these vanes register concurrently with the side margins of the inlet and outlet ports so that the material is completely and cleanly expelled and carried by a blast of air into and through the delivery pipe without choking or clogging. With the vanes in continuous rotation, the flow through the delivery pipe is regular and substantially continuous although there is slight intermittent pulsation.

By way of example, a device embodying the present invention using a 30 h.p. motor to drive the blower is capable of delivering 420 barrels of Portland cement powder per hour to an elevation of 100 feet or through a pipe having horizontal and vertical components equivalent to a lift of 100 feet, the air being delivered at 380 cubic feet per minute and 12 pounds pressure. In contrast, a competitive device using a 40 H.P. motor on a blower delivering 510 cubic feet per minute at 12 pounds pressure would deliver only 200 pounds of Portland cement powder per hour through the same delivery system.

An another example, a delivery system from a device according to the present invention having 161 feet of horizontal extent and 35 feet of vertical extent has been found to deliver 255 barrels of Portland cement per hour using a 50 H.P. motor to drive the blower. The air was delivered at 550 cubic feet per minute and 12 pounds pressure. I know of no competitive dveice capable of delivering cement through such a system at more than half of this rate.

The device disclosed does not have excessive wear or blow-back through the hopper.

Even without the wipers, there is little or no blow-back of material. With the wipers, no blow-back is experienced since there is a complete closure intervening at all times between that lower portion of the chamber to which the air has access and that upper portion of the chamber into which the material is introduced. It will be observed that in the preferred construction shown I use six vanes at approximately 60° spacing and the arcuate extent of the cylindrical portion 8 of the chamber 6 is about 180°, the walls above such arcuate portion preferably being straight and non-convergent, to prevent bridging.

It will be observed that a unique method of control can be employed when the apparatus of the present invention is used. The rotation of the rotor actually meters into the convection current, the powder material flowing from hopper 68 into the intervane spaces of the rotor inlet into the chamber. Regardless of the condition existing in the discharge conduit with which the convection current outlet shown at 42 communicates, the condition can be rectified to maintain optimum flow by simply regulating the rate at which the material is delivered into the current. Thus, if the pressure falls at gauge 65, the flow will no longer be at the most effective level but the operator can restore optimum conditions by simply retarding the rate of rotation of the rotor so that fewer increments of material will be delivered into the convection current in a given period of time. By reducing the load on the delivery system, the back pressure will fall toward the desired standard which is here assumed to be 12 pounds to the square inch. Conversely, if the pressure at gauge 65 falls materially below the established valve, the operator has only to increase the rate of rotation of the rotor to deliver material into the convection current at an increased rate, thereby again restoring the system to maximum efficiency.

I claim:

1. In a rotary feeder for a pneumatic conveyor system of the type using a rotary feeder in a chamber having a generally cylindrical bottom wall portion and opposed inlet and outlet ports at its ends for convection air, the improvement which comprises the combination with such a chamber with directly opposed ports of segmental form of substantially radial side margins, and convection air inlet and outlet ducts comunicating with said ports, of means communicating with the inlet duct for supplying air under pressure, a rotor having vanes fitted to the cylindrical bottom wall and ends of said chamber and having vanes angularly spaced for substantially precise registration with said side margins and intervane spaces successively registering with said ports in the course of rotor rotation, said spaces corresponding closely in cross section and outline with the respective ports with which they register, and means for rotating the rotor.

2. A rotary feeder according to claim 1 in combination with means for maintaining convection-air-inlet pressures at a substantially constant predetermined value by compensating for variable factors affecting optimum power-to-delivery-rate ratios, said last means including means for varying the rate of operation of said rotor in a direction to increase the rate of rotor operation if inlet pressures fall below said predetermined value and to decrease said rate if said pressures rise above said value.

3. A rotary feeder according to claim 1 in which the ends of the chamber have synthetic resin linings with which portions of the rotor are in sealing engagement.

4. A rotory feeder according to claim 3 in which the said rotor portions comprise flexible wiping means projecting from respective vanes into engagement with the cylindrical bottom wall portion and end walls of the chamber to seal the rotor to the chamber as the rotor is rotated therein.

5. A rotary feeder for a pneumatic conveyor system, said feeder comprising a chamber having a top inlet for material to be conveyed, a cylindrical bottom portion and end walls provided with segmental air inlet and outlet ports, said walls having angularly spaced generally radial margins bounding said ports, in combination with a rotor mounted in the chamber substantially coaxially with said cylindrical bottom portion, said rotor having vanes spaced for substantially registering simultaneously with said margins and having intervane spaces registerable with the ports in the course of rotation of the rotor, the vanes and margins being at an angular spacing sufficiently small in relation to the arcuate extent of said chamber bottom portion so that vanes intervent at all times between the top inlet and said ports, the vanes having means in sealing engagement with the end walls and bottom portion of the chamber, means for supplying convection air to the air inlet port, conduit means for air and conveyed material leading from the outlet port, and means for rotating the rotor and including means for variably regulating its rate of rotation.

6. A rotary feeder according to claim 5 including pressure responsive means exposed to said air supply means, whereby the rate of rotation can be correlated with back pressure in said air supplying means to achieve maximum delivery under the existing conditions in said conduit means.

7. A rotary feeder according to claim 5 in which the outlines of said air inlet and outlet ports are such that the ports correspond substantially exactly in form and area with intervane spaces successively registering therewith.

8. A rotary feeder according to claim 5 in which the end walls of the chamber have liners laminated thereon, and the vane means in sealing engagement comprise flexible members projecting axially and peripherally from respective vanes and in wiping abutment with the bottom portion of the chamber and the said end wall liners.

9. A rotory feeder for a pneumatic conveyor system, said feeder comprising a chamber having a top inlet for material to be conveyed, a cylindrical bottom portion and end walls provided with air inlet and outlet ports, in combination with a rotor mounted in the chamber substantially coaxially with said cylindrical bottom portion, said rotor having vanes with intervane spaces registrable with the ports in the course of rotation of the rotor, and the vanes being at an angular spacing sufficiently small in relation to the arcuate extent of said chamber bottom portion that vanes intervene at all times between the top inlet and said ports, the vanes having means in sealing engagement with the end walls and bottom portion of the chamber, means for supplying convection air to the air inlet port, conduit means for air and conveyed material leading from the outlet port, and means for rotating the rotor and including means for variably regulating its rate of rotation, said rotor having a hub from which said vanes project and end caps on the hub having fingers extending into the invervane spaces and having terminal surfaces confronting the end walls and provided with at least one annular rib in bearing engagement with a respective end wall.

10. A rotary feeder according to claim 9 in which each such cap includes a pair of such ribs which are mutually spaced radially, each rib being in wiping engagement with the end wall and the pair of ribs, establishing two seals.

References Cited by the Examiner
UNITED STATES PATENTS

| | | | |
|---|---|---|---|
| 1,321,262 | 11/1919 | Townsend | 302—42 |
| 1,935,977 | 11/1933 | Geer | 302—49 |
| 2,715,246 | 8/1955 | Van Doorn | 302—49 |
| 2,757,049 | 7/1956 | Temple | 302—49 |
| 3,178,237 | 4/1965 | MacDonald | 302—49 |

ANDRES H. NIELSEN, *Primary Examiner.*

EVON C. BLUNK, *Examiner.*